United States Patent [19] [11] 4,038,685
Bazin [45] July 26, 1977

[54] APPARATUS FOR AUTOMATIC GAMMA CONTROL OF TELEVISION COLOR SIGNALS
[75] Inventor: Lucas John Bazin, Stratford, N.J.
[73] Assignee: RCA Corporation, New York, N.Y.
[21] Appl. No.: 563,684
[22] Filed: Mar. 31, 1975
[51] Int. Cl.² ............................................. H04N 9/53
[52] U.S. Cl. ..................................................... 358/32
[58] Field of Search ........................... 358/32, 29, 164; 178/DIG. 16

[56] References Cited

U.S. PATENT DOCUMENTS

| | | | |
|---|---|---|---|
| 2,514,022 | 7/1950 | Bedford | 178/DIG. 16 |
| 3,627,911 | 12/1971 | Kubota et al. | 358/29 |
| 3,772,462 | 11/1973 | Schneider | 358/29 |
| 3,786,177 | 1/1974 | Bazin | 358/29 |
| 3,808,358 | 4/1974 | Schneider | 358/29 |

Primary Examiner—John C. Martin
Assistant Examiner—Mitchell Saffian
Attorney, Agent, or Firm—Eugene M. Whitacre; Mason DeCamillis

[57] ABSTRACT

A plurality of comparators are used to compare the red, blue and green color signals of a color television camera against a first and second predetermined signal level threshold corresponding to selected values of grey scale. The outputs of the comparators are combined to ascertain the difference in signal amplitude between the red, blue and green signals with respect to the first and second predetermined signal thresholds which represent grey. If the amplitude deviation of the red, blue and green color signals is within the threshold limits, a control signal adjusts the gamma characteristics of the blue and red color channels to match the amplitude of the red and blue color signals to the amplitude of the green color signal to correct to grey. If the red, blue and green color signal deviation is without the threshold limits, the color signal is assumed correct and no adjustment is made.

The system provides automatic and continuous correction of gamma characteristics of the video signals generated by the television camera during the telecasting of an actual program source.

9 Claims, 5 Drawing Figures

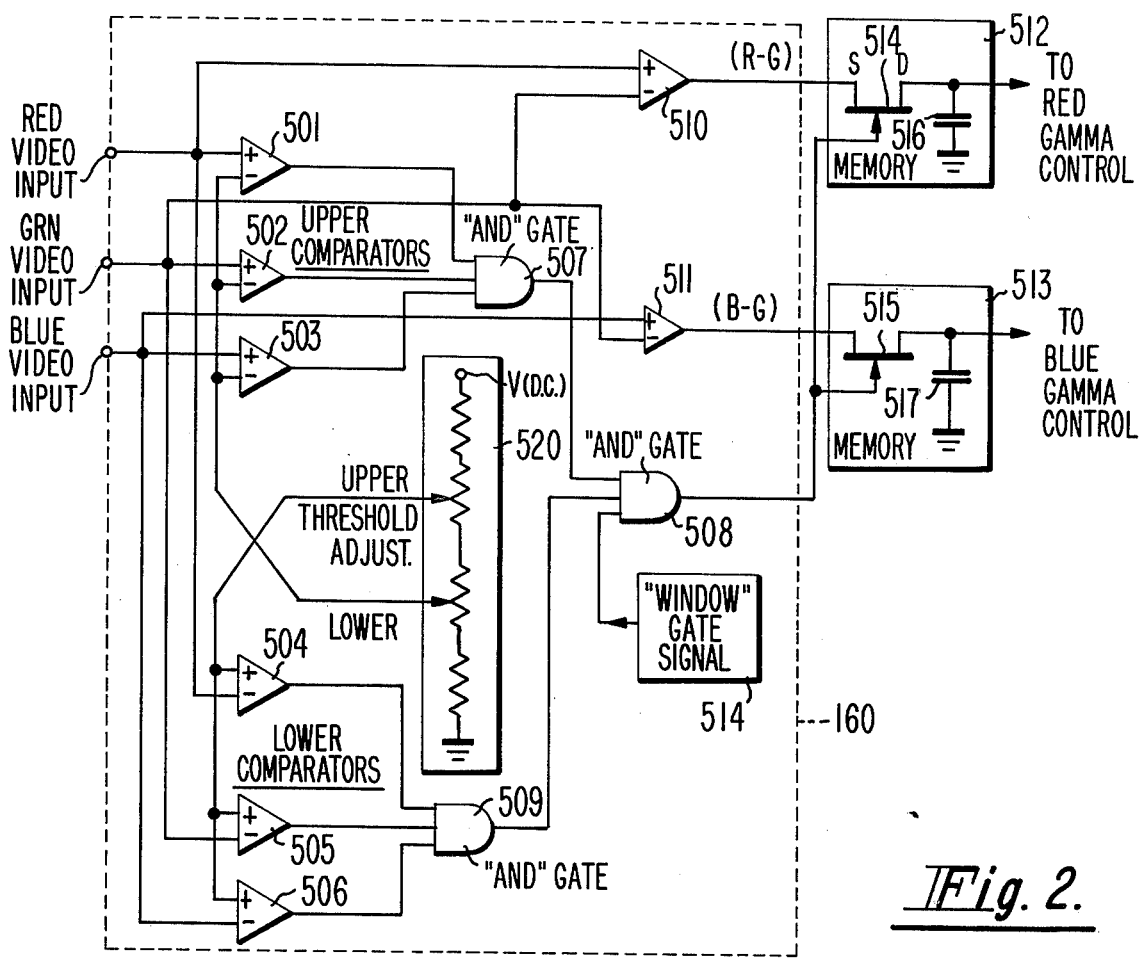
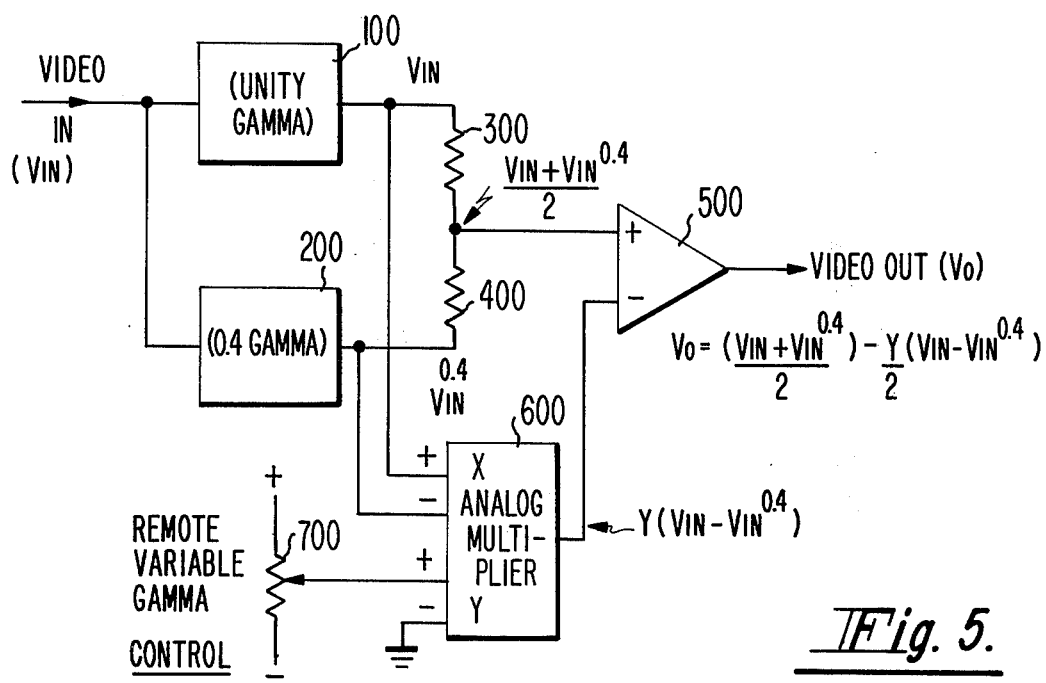
Fig. 2.
Fig. 5.

APPARATUS FOR AUTOMATIC GAMMA CONTROL OF TELEVISION COLOR SIGNALS

The present invention relates to apparatus for automatic gamma control of color signals generated by a television film camera wherein the relative amplitude of the color signals are adjusted.

Automatic color balancing has been used to adjust the black level balance and gains of the red and blue signals relative to those of the green signals to provide white level balance in the processing amplifier following a television camera. This is particularly important to do when the program material picked up by the television camera has been recorded on motion picture film. Automatic color balancing as shown in U.S. Pat. No. 3,786,177, entitled "Apparatus for Automatic Color Balancing of Television Camera Signals" has been successfully used to ascertain when substantially black or substantially white signals were to be provided to the colorplexer of a television camera chain when the source of program material comprises a sequence of film sources, Such a sequence of film sources may consist of motion picture film, film clips of news interviews, on the spot news recordings, filmed commercials, all of which may be filmed under widely varying lighting conditions and subsequent processing resulting in a wide variation of density and color from scene to scene, as well as from sequence to sequence in the final edited version to be telecast. Motion picture color film of current manufacture typically consists of three primary color dye layers identified as yellow, magenta and cyan; improper processing, aging or a combination of these affects can unbalance the final color represented by these primary dye layers. Automatic color balancing of the type described in U.S. Pat. No. 3,786,177 serves to provide a more uniformly balanced signal for transmission by ascertaining for each scene a substantially black and substantially white level; however, such a system does not necessarily provide the desired color signal balance intermediate the levels established for black, which represents a lack of color information, and white which represents equal amounts of color information. A lack of compensation in the area of color information intermediate the established black and white levels is particularly troublesome in the instances where the motion picture film suffers a color defect due to improper processing or as more commonly observed, the normal aging of a previously recorded film.

Since a typical scene contains a significant amount of detail which is reproduced only as shades of brightness, it is necessary to have equal amounts of all three primary colors to represent white and various shades of grey scale throughout the picture. The loss of diminishing of one of the primary colors results in a shift of the white or grey areas of the scene content toward the remaining predominant colors and the reproduced picture appears with an overall color cast.

A typical example of this occurs in motion picture film due to fading with time of one or more of the primary dyes used in the manufacture of the color film. At present, the cyan dye is the most susceptible to fading with time. The loss of cyan on reproduction of the film in a telecine camera results in a loss of blue-green color signal information and the resultant picture is reproduced with the grey areas of the picture content shifted toward a red-orange color representing the predominance of yellow and magenta dye layers. Automatic color balancing based on establishing black level and white level does not compensate the grey scale intermediate these levels.

Present practice to overcome the lack of correction in the grey scale area requires either continuous manual monitoring of the gamma controls during the telecast or a previewing of each segment of film in order to predetermine the necessary gamma corrections in advance. A form of automatic system has been proposed which requires a previewing of the film by an operator who estimates the required gamma adjustments and enters them on a perforated tape or record medium which is then run in sychronism with the film during the telecast to relieve the operator of continuous manual control of gamma adjustments. This present practice of previewing or advance preparation is costly and time-consuming requiring literally an hour of previewing in advance for each hour of telecast. This is especially uneconomical when feature films are telecast.

The concept of color correction on which the present invention is based is that colors close to grey are assumed to be grey and can be made grey without seriously affecting a good color picture. The invention utilizes the availability of the red, green and blue signals in a color television camera to provide the necessary color signal samples to adjust the colored grey scale. In a properly operating color television camera, a grey scale represents equal amounts of video signals in each of the red, green and blue channels intermediate the black and white levels. A detector samples the red, blue and green signal levels available in the respective channels and when the three signals are within a predetermined level of each other, an error correcting signal is applied to the appropriate gamma circuit to balance the three signal levels so as to produce a grey signal.

In accordance with the present invention automatic gamma correction apparatus comprises means providing a pair of signal translating channels for a pair of related signals. Gamma correction circuitry is included in one of the signal translating channels. The gamma correction circuitry is responsive to a control signal to alter the gamma correction characteristic of the signal translating channel. The system includes means for comparing the amplitude levels of the pair of related signals in a relatively narrow range of amplitude levels between the maximum and minimum levels of the signals. Means coupled to the comparing means and to the signal translating channels develop a control signal of a value related to the differential amplitude between the pair of signals when both of the signals have an amplitude within the narrow range of amplitude levels. The control signal is applied to the gamma correction circuitry for altering the gamma characteristic of its signal translating channel in a direction so as to make the amplitude of the pair of related signals equal.

A further feature of the present invention provides a logic circuit for determining when all of a plurality of signals are within a predetermined amplitude range comprising first comparing means for developing a first output signal when all of the signals are above an upper predetermined amplitude. Second comparing means for developing a second output signal when all of the signals are below a a lower predetermined amplitude, and third comparing means coupled to the first and second comparing means for developing a third output signal in response to coincidence of the first and second output signals.

The present invention will be better understood by reference to the accompanying drawings and specification in which:

FIG. 2 is a block diagram of a detector embodying the present invention;

FIG. 5 is a block diagram of an adjustable gamma correction circuit useful in implementing the present invention.

Figure 1:
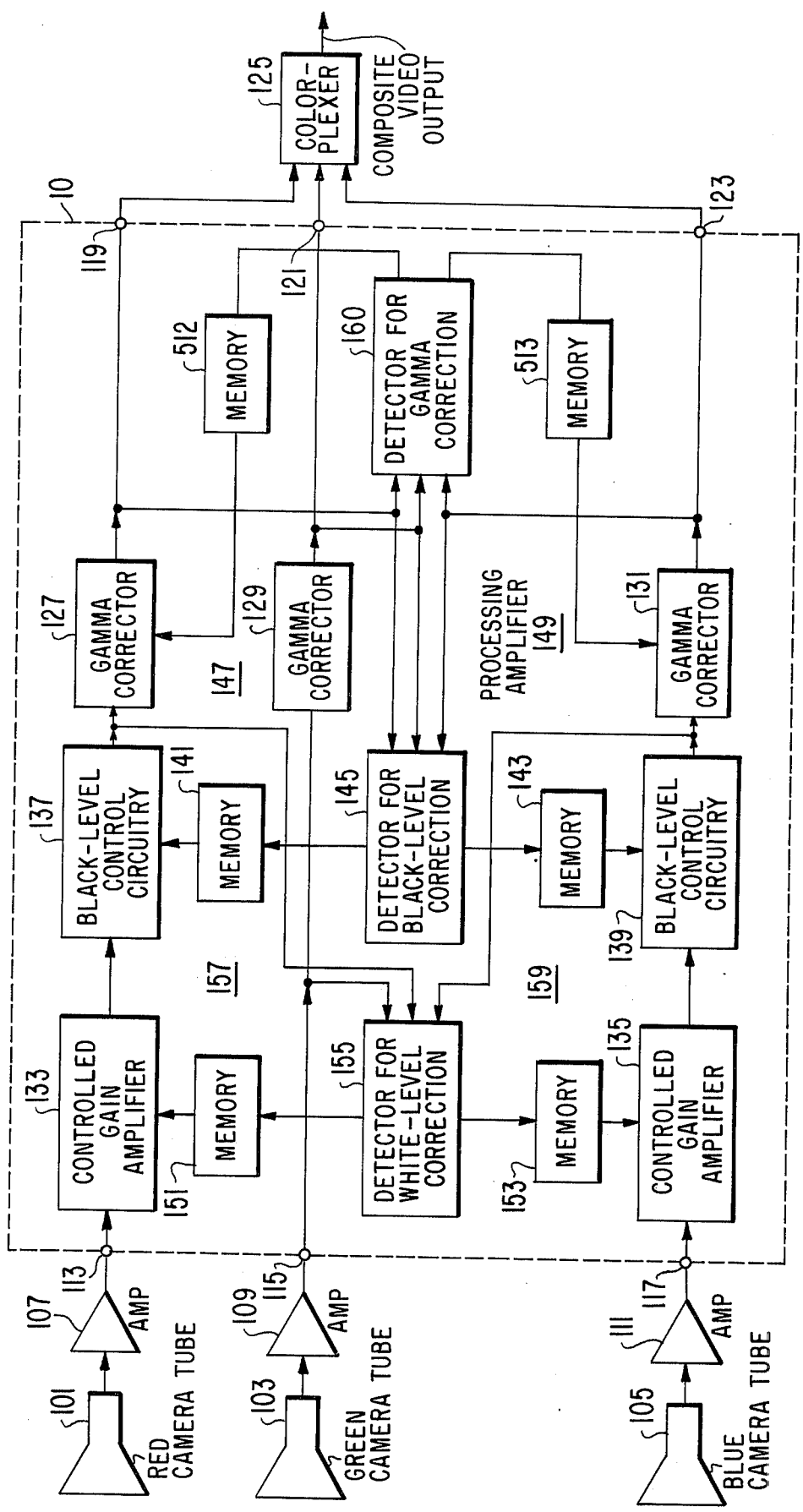
FIG. 1 is a block diagram of an automatic color balance-automatic gamma system embodying the present invention.

FIG. 1 shows an automatic color balancing system of the type shown in U.S. Pat. No. 3,786,177, which is incorporated herein by reference. Briefly, FIG. 1 shows an automatic color balancing system incorporated in a video processing amplifier 10. Red, green and blue color signals respectively, originate at camera tubes 101, 103, 105. The original red, green and blue color signals are respectively amplified in amplifiers 107, 109, 111 associated with the camera head and are thereafter respectively applied to input terminals 113, 115, 117 of the processing amplifier 10. The terminals 113, 115 and 117 are coupled to the input circuits of gamma correctors 127, 129, 131, respectively, and thence to output terminals 119, 121, 123. The gamma-corrected color signals appearing at the terminals 119, 121, 123 are applied to a colorplexer 125 which combines them to provide a composite video output signal.

The gamma correctors 127 and 131 are each preceded by the cascade combination of a controlled gain amplifier (133, 135) and a black-level control circuit (137, 139). The black-level control circuits 137, 139 add varying amounts of black-level pedestal to the red and blue color signals, respectively, in response to first and second control signals, respectively, as provided from analog memories 141, 143, respectively. The information retained in the memories 141, 143 is obtained from the red, blue and green color signals by a detector 145 which provides black-level correction information during substantially black portions of the scene presented to the camera tubes 101, 103, 105.

The signal applied to the memory 141 by the detector 145 during black portions of the scene is responsive to the difference between the amplitude of the red and the green gamma-corrected color signals at the output circuits of the gamma correctors 127, 129, respectively. The signal applied to the memory 143 by the detector 145 during black portions of the scene is responsive to the difference between the amplitudes of the blue and the green gamma-corrected signals at the output circuits of the gamma correctors 131, 129, respectively. A black-level correction feedback loop 147 containing elements 137, 127, 145, 141 and the black-level correction feedback loop 149 containing elements 139, 131, 145, 143 are arranged to degenerate the discrepancies in the black-levels of the gamma-corrected blue color signal (at 123) respectively, as compared to the black level of the gamma-corrected green color signal (at 121).

The controlled gain amplifiers 133, 135 are responsive to third and fourth control signals from analog memories 151, 153, respectively. The information retained in the memories 151, 153 is obtained from the red, blue and green color signals by a detector 155 which provides white-level correction information during substantially white portions of the scene presented to the camera tubes 101, 103, 105. The signal applied to the memory 151 by the detector 155 during white portions of the scene is responsive to the difference between the amplitudes of the red and the green color signals at the input circuits of the gamma correctors 127, 129, respectively. The signal applied to the memory 153 by the detector 155 during white portions of the scene is responsive to the difference between the amplitudes of the blue and the green color signals at the input circuits of the gamma correctors 131, 129, respectively. The white-level correction feedback loop 157 containing elements 133, 137, 155, 151 and the white-level correction feedback loop 159 containing elements 135, 139, 155, 153 are arranged to degenerate the discrepancies in the amplitudes of the red and the blue color signals, respectively, as compared to the green color signal for neutral-color signals (whites and greys), which is often referred to as "white-level correction."

Variations in the order of cascade connection of a controlled gain amplifier for white-level correction, black-level correction and gamma correction and variations as to the points in that cascade combination from which error signals are obtained are met in various processing amplifier designs. The gamma correctors 127, 129, 131 increase the gain of the black-going portions of the signals applied to their input circuits compared to the white-going portions of such signals. Taking error signals for black-level correction from the output circuits of the gamma correctors 127, 129, 131 as shown in FIG. 1 can increase the resolution against error of the black-level correction system. Taking error signals for white-level correction before gamma correctors 127, 129, 131 better preserves the resolution against error of the white-level correction system. Taking error signals for white-level correction after black-level circuits 137, 139 avoids having to provide separate means for black-level restoration of the controlled gain amplifier 133, 135 output signals, such black-level restoration being necessary to provide proper biasing for the input circuits of the detector 155.

Video processing amplifier 10 also includes detector 160 which, as will be described, samples the red, green and blue color signals at the output of the gamma correctors 127, 129, 131 and provides gamma correcting feedback signals to the gamma correctors so as to maintain a corrected grey scale in accordance with the present invention.

FIG. 2 shows the gamma correction detector 160 of FIG. 1 in greater detail.

Gamma corrected red (R), green (G) and blue (B) video signals from gamma correctors 127, 129, 131 of FIG. 1 are applied respectively to comparators 501, 502, 503 which provide increased output in response to signals above a predetermined threshold and are therefore termed upper comparators. Simultaneously, the same R, G and B color signals are applied respectively to comparators 503, 504 and 506 which provide increased output in response to signals below a second different threshold, and are therefore called lower comparators. A reference source 520 comprising a voltage divider with respective upper and lower threshold voltage taps is coupled to the respective upper and lower comparators to provide a predetermined level against which the applied R, G, B signals are compared.

When a video signal exceeds the predetermined lower threshold signal level, the output of the upper comparators 501, 502, 503 responds with a logic 1 and when the video signal does not exceed the predetermined signal level, the comparators respond with a logic 0. Similarly, when a color signal exceeds the predetermined upper threshold signal level, the output of the lower comparators 504, 505, 506 respond with a logic 0 and when the color signal does not exceed the predetermined signal level, the comparators respond with a logic 1.

The outputs of the upper comparators 501, 502, 503 represented by a logic 1 or logic 0 are coupled to AND gate 507. The output of AND gate 507 is a logic 1 only when all of the inputs representing upper comparators 501, 502, 503 are logic 1.

The outputs of lower comparators 504, 505, 506 represented by a logic 1 or logic 0 are coupled to AND gate 509. The output of AND gate 509 is a logic 1 only when all of the inputs representing lower comparators 504, 505, 506 are logic 1.

The outputs of AND gates 507, 509 and a gating signal 514 are coupled to AND gate 508 so that AND gate 508 provides an output represented as logic 1 only when both inputs from AND gates 507 and 509 are at logic 1 and the gate signal is present.

The R and G signals are applied to a differential amplifier 510 to develop a difference signal R-G which is applied to memory circuit 512.

Similarly, the B and G signals are applied to a differential amplifier 511 to develop a difference signal G-Y which is applied to a memory circuit 513.

Memories 512 and 513 each comprise a field effect transistor (FET) 514, 515 and capacitors 516, 517 respectively. The capacitors 516 and 517 are each high quality polystyrene capacitors capable of retaining a charge on themselves for hours at a time. Together with FET's 514 and 515, capacitors 516 and 517 form sample and hold memory circuits.

The output of AND gate 508 in the form of a logic 1 serves to close the FET switches in memories 512 and 513 to sample the R-G and B-G signals respectively only if an input corresponding to a logic 1 output from both the AND gates 507 and 509 is present during the gating signal applied to AND gate 508. The outputs of the memories 512 and 513 are coupled to the adjustable gamma circuits 127, 131 of FIG. 1 to provide the control signal for controlling the grey scale gamma of the red and blue color signals respectively relative to the reference green color signal over the entire dynamic range of the applied signals. A gamma circuit suitable for the adjustable gamma corrector circuits 127, 131 of FIG. 1 is illustrated in FIG. 5 and described in detail in co-pending application Ser. No. 563,683 of Lucas John Bazin and Gary Ray Peterson, now U.S. Pat. No. 3,970,774, assigned to the same assignee and filed concurrently herewith entitled "Electronic Signal Mixer". As shown in FIG. 5, a video signal $V_{in}$ is coupled to linear amplifier 100 and non-linear amplifier 200. The outputs of amplifiers 100, 200, $V_{in}$ and $V_{in}^4$, respectively, are coupled to a resistive mixer 300, 400 to provide a first summation of linear and non-linear signals, and further coupled to a voltage multiplier 600 to provide a second summation of linear and non-linear signals. A control voltage 700, for example, the output signal of memories 512 or 513 is coupled to the voltage multiplier 500 to vary the value of a coefficient "Y" which serves to multiply the second summation of linear and non-linear signals. The first and second combined signals are summed in amplifier 500 to provide an output signal $V_o$ which may be varied from $V_{in}$ to $V_{in}^4$ in response to the applied control voltage 700.

Figures 3, 4:
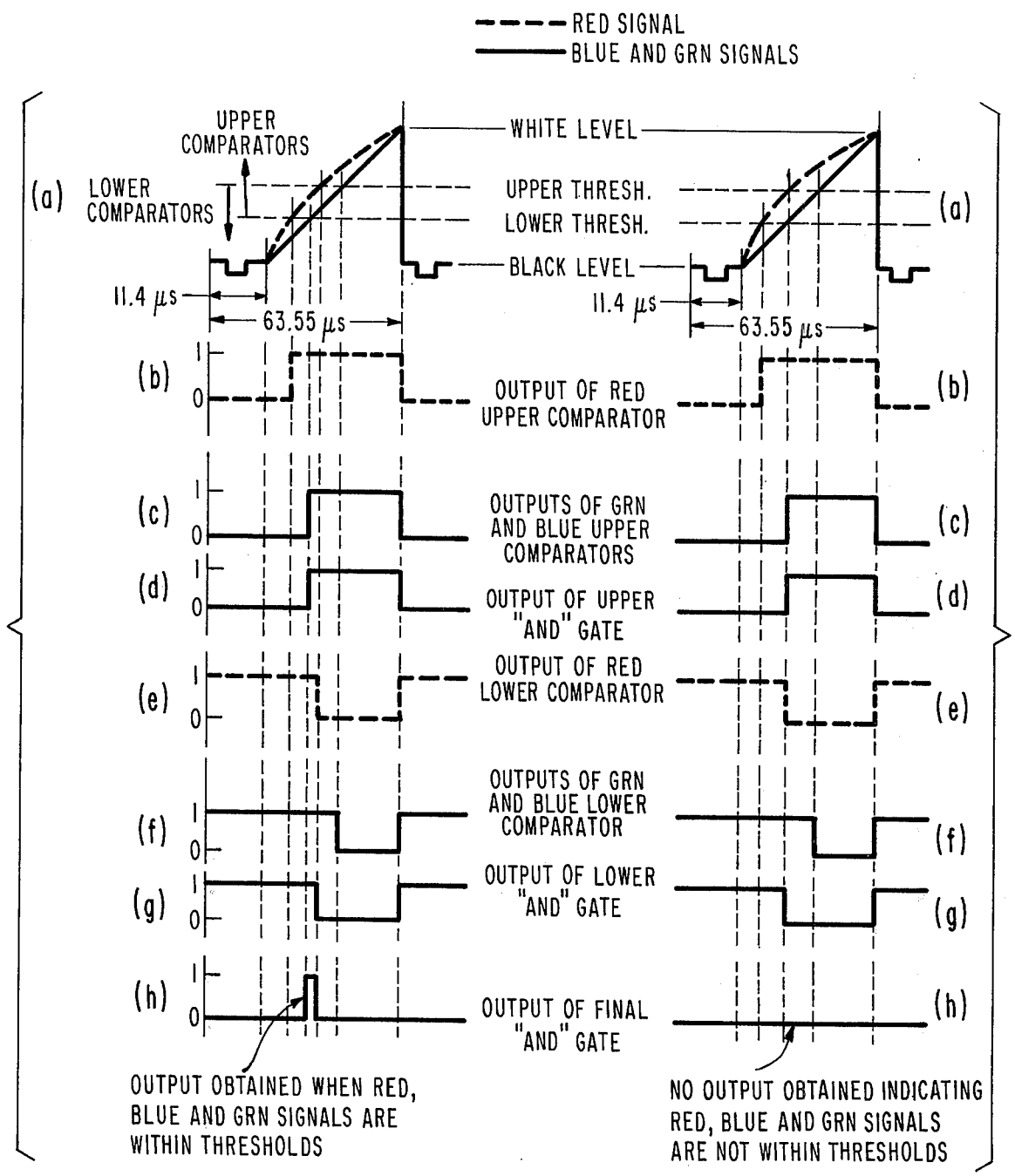
FIGS. 3 and 4 are waveforms depicting the operation of the apparatus of FIG. 2.

The operation of the circuitry of FIG. 2 can be better understood with reference to FIG. 3 which illustrates differences in the red, green and blue color signals within the predetermined threshold level and in FIG. 4 differences in red, green and blue color signals which occur outside the predetermined threshold level. In FIGS. 3 and 4 waveforms 3a and 3b illustrate a video waveform with a time base representing a single horizontal line of a television picture frame with a duration of 63.55 microseconds in accordance with NTSC standards. The amplitude of waveforms 3a and 3b illustrate a video signal which varies uniformly from black at the beginning of the active picture time following the blanking interval to white at the end of the active picture time preceding the next blanking interval. The R, G, B video signal levels for black level and white level are presumed to be established either by means of the apparatus illustrated in FIG. 1 or similar means. Typical values for black level and white reference levels are 5% and 95%, respectively. By means of upper and lower threshold adjustment 520, voltages corresponding to 45% and 55% of full scale are selected as predetermined thresholds for grey. It will be noted, as previously discussed, that a lack of video signal information represents black level, an equal amount of R,G,B, video signal information at full scale represents white and equal amounts of R, G, and B video signal information at an amplitude of 50% represents grey. FIG. 3 illustrates the operation of the systems of FIG. 2 when only the red color signal shown in waveform 3a is different in value from the blue and green signals but within the threshold limits established by the upper and lower comparators in conjunction with reference 520. Outputs from each of the upper R, G, and B comparators shown as waveforms 3b, 3c are summed in the upper AND gate 507, while the outputs of each of the lower R, G, B comparators shown as waveforms 3e and 3f are summed in the lower AND gate 508. The outputs of upper AND gate 507 shown as waveform 3d and of lower AND gate 508 shown as waveform 3e are summed in AND gate 508, resulting in output waveform 3h from AND gate 508 which enables sample and hold memories 512 and 513 to establish control values responsive to the difference signal R-G from difference amplifier 510 and B-G from difference amplifier 511. The control values established at memories 512 and 513 respectively are coupled to the red and blue channel gamma control to change the transfer characteristic of the gamma circuit 127, 131 to correct the red and blue color signals to a level equivalent to the reference green color signal over the entire dynamic range of the applied signals thereby producing grey.

Similarly, in FIG. 4 a red color signal deviating from the blue and green color signals, is shown in waveform 4a; however, as illustrated in waveforms 4b, 4c, 4e, 4f and their summation in AND gate input waveforms 4d and 4g, the resultant output waveform from AND gate 508 indicates the red color signal is outside the selected threshold limit. AND gate 508 does not provide a signal in this instance to enable sample and hold memories 512 and 513 to establish new control values responsive to the R-G and B-G difference signals, since by definition if a color signal exceeds the selected upper and lower thresholds (i.e., not within the "window"), it is assumed that the color belongs in the overall picture and it is not desirable to make it equivalent to grey.

As noted in conjunction with FIG. 2, final AND gate 508 has as its input a gating signal which is required in addition to a logic 1 from AND gates 507, 509 for an output to be provided at gate 508. In the illustrated embodiments, a "wide gate signal" in the form of a logic 1 derived from the horizontal and vertical line frequency is used in addition to a logic 1 from AND gates 507, 509 to enable a logic 1 at the output of gate 508 during approximately 90% of the active picture area to prevent shading and edge transient phenomena during edge portions of the picture from initiating gamma correction. In summary, the red, green and blue color signals are compared during the active picture area at selected grey scale values and when their deviation is small or close to grey, the red and blue grey scale gamma transfer characteristic is matched to the green grey scale gamma characteristic to produce grey. If the red, blue and green deviation is larger than the established threshold, the color signal is presumed to be a correct color and a correction to grey is not made.

What is claimed is:

1. Automatic gamma correction apparatus for continuously correcting the gamma characteristic of one or more video signals generated by a television camera during the telecasting of an actual program source, said video signals being representative of said program source and occurring within predetermined maximum and minimum amplitude levels during transmission of said signals, comprising:
    means providing a pair of signal translating channels for a pair of related video signals;
    gamma correction circuitry included in one of said pair of signal translating channels, said gamma correction circuitry responsive to a control signal to alter the gamma correction characteristic of said channel;
    means for continuously comparing the amplitude levels of said pair of signals in a relatively narrow range of amplitude levels between the maximum and minimum levels of said signals;
    means coupled to said comparing means and to said signal translating channels for developing a control signal of a value related to the differential amplitude between said pair of signals when both of said signals have an amplitude within said narrow range of amplitude levels; and
    means for applying said control signal to said gamma correction circuitry for altering the gamma characteristic of said one signal translating channel in a direction so as to make the amplitude of said pair of signals equal.

2. The apparatus of claim 1 wherein said relatively narrow range represents a range of 45% to 55% of said maximum level of said video signals.

3. Automatic gamma correction apparatus for color television apparatus of the type producing at least three color video signals generated by a television camera during the telecasting of an actual program source, said video signals being representative of said program source and occurring within predetermined maximum and minimum amplitude levels during transmission of said signals, comprising:
    means providing separate signal translating channels for each of said video signals;
    first gamma correction circuitry included in one of said signal translating channels, second gamma correction circuitry included in another of said signal translating channels, said first and second gamma correction circuitry responsive to control signals to alter the gamma correction characteristic;
    means for continuously comparing the amplitude levels of said video signals in a relatively narrow range of amplitude levels between the maximum and minimum levels of said video signals;
    means coupled to said comparing means and to said signal translating channels for developing at least two control signals of a value related to the amplitudes of said video signals when all of said video signals have an amplitude within said narrow range of amplitude levels; and
    means for applying said control signals, respectively to said first and second gamma correction circuitry for altering the gamma characteristics of their respective signal translating channel in a direction so as to make said video signals equal.

4. The apparatus of claim 3 wherein said three video signals represent Red, Green and Blue colors.

5. The apparatus of claim 3 wherein said means for developing said first and second difference signals comprises first and second differential amplifiers.

6. The apparatus of claim 3 wherein said first, second and third video signals are Red (R), Green (G) and Blue (B) video signals and said first difference signal is R-G and said second difference signal is B-G.

7. The apparatus of claim 3 wherein said means coupled to said comparing means includes means for developing a first difference signal related to the amplitude difference of a first and a second of said three video signals and a second difference signal related to the amplitude difference of said second and third of said three video signals.

8. The apparatus of claim 7 wherein said means coupled to said comparing means also includes means for developing control signals proportional to the amplitude of said difference signals.

9. The apparatus of claim 8 wherein said means for developing control signals includes a memory circuit comprising a semiconductor gate and a capacitor.

* * * * *